Patented Mar. 27, 1934

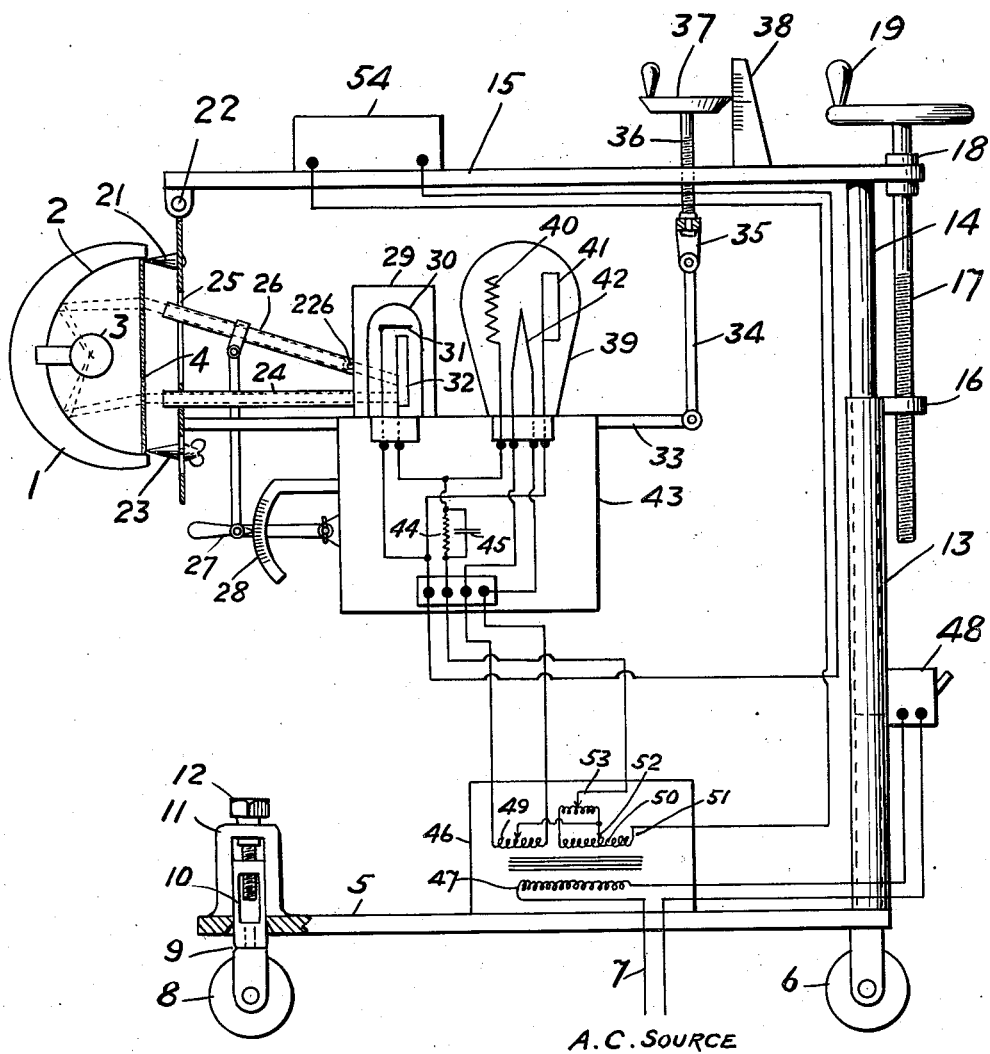

1,952,210

UNITED STATES PATENT OFFICE 1,952,210

LAMP TESTING DEVICE

Robert R. Kenworthy, Philadelphia, Pa., assignor to William A. Schnader, Philadelphia, Pa.

Application July 24, 1931, Serial No. 552,833

4 Claims. (Cl. 88—14)

The subject of my invention is a device for testing lamps, especially those used in the headlights of automobiles or other vehicles. My device consists of a convenient portable means for achieving this function. My novel lamp tester includes means for adjusting the device into proper location relative to the lamp to be tested, a pair of tubes which are relatively long and small in diameter whose interior has been treated so as to absorb all but the direct ray of light passing axially through the tube, a vacuum tube on which the selected rays of light are caused to fall, means for amplifying the effect caused by these rays and a meter for measuring this effect. My device is first used in the laboratory on lamps of various types and makes at present in actual use which are later to be tested. Charts are drawn up for the proper readings of such headlights. These charts are furnished to the user with my device. If the reading obtained on the headlight to be tested with my device is not equ... to the proper reading according to the cha... the light undergoing test is adjusted until a proper reading is attained. If this cannot be done with the bulb in the headlight a new bulb is substituted and the test continued until the proper reading is secured.

In the drawing,

My device is shown schematically and diagrammatically with no attempt to preserve the proportion.

In the embodiment of my invention, chosen for illustration in the drawing, 1 represents the outer shell of the motor vehicle headlight or other lamp which is to be tested, aimed, focused or otherwise adjusted. 2 is the parabolic or specially shaped reflector used in the headlight. 3 is the electric bulb or other source of light in said headlight. At its front the headlight is provided with a lens 4 which may be of a special type for correcting the rays of light coming from the reflector 2.

My light testing device consists of a base 5 mounted on a pair of wheels 6 and on which all the parts of my device are carried except the cable represented at 7 which leads to the source of alternating current. At its front end, base 1 carries a guide wheel 8 which is mounted in a freely rotatable caster 9. The caster is carried in a bracket 10 which in turn is mounted in a frame 11, being adjustably supported therein by bolt 12 or in any other convenient manner. At the rear thereof base 5 carries one or more standards 13 shown as consisting of hollow tubes in which there are rod or rods 14 which support the table 15. Standards 13 carry fast thereon nut 16 through which passes screw 17 which is mounted in a bushing 18 in table 15 and which is operated by hand wheel 19 to adjust the height of the table 15 to a convenient level. At the front of table 15 is mounted a baffle plate 20 having a top pin 21 fixedly mounted therein. Baffle plate 20 is pivotally mounted to table 15 at 22. Lower pin 23 is adjustably mounted in baffle plate 20. In the lower part of baffle plate 20 there is fixed a hollow tube 24 which is approximately horizontal. Baffle plate 20 also has in its front a narrow slit 25 through which moves adjustable tube 26, pivoted at 226, the amount of movement of which is measured by handle 27 relative to pointer 28 and which is clamped in any selected position. Tubes 24 and 25 are relatively long and of small diameter. The interiors of these tubes are treated to absorb any light rays except those falling axially upon the ends of these tubes. At their rear ends tubes 24 and 26 pass into a light-tight, ventilated housing 29 which contains a vacuum tube 30 having an anode 31 and a cathode 32. The rays of light are represented by dotted lines coming from the bulb 3 to the reflector 2 passing through the tubes 24 and 26 past the anode 31 onto the cathode 32.

Baffle plate 20 carries rigidly attached thereto tray 33 which has a link 34 pivotally connected thereto at its rear end. At its upper end link 34 is pivotally connected to swivel 35 which is loosely connected to screw 36 which is turned at its upper end by hand wheel 37 which also serves as a pointer in cooperation with fixed scale 38 on table 15. Tray 33 carries housing 29 and vacuum tube 30 thereon and also carries thereon amplifier tube 39 having a customary grid 40, plate 41 and filament 42. Tray 33 also carries a light but strong shell 43 into which the tube bases fit and which is dust and moisture tight. Shell 43 carries the parts shown schematically, such as the tube bases and the grid resistance 44 and the grid condenser 45. On the base 5 there is conveniently carried a transformer 416 of which the coils are shown diagrammatically. Coil 47 is the primary coil intended for 110 volts of alternating current led to it through the cable 7 and controlled by switch 48. Coil 49 is a mid-tapped secondary coil producing six volts in all for the filament operation of tube 30. Another secondary coil as generally indicated at 50 is split so that tap end 51 gives 220 volts and tap 52 gives 110 volts shunted by the potentiometer 53. The mid-tap or adjustable arm of potentiometer 53 is connected to the grid of tube 39. The wiring scheme here illustrated is one well known in the art and is not novel with me but is a convenient part of my novel device. Connected across transformer 46 and tubes 30 and 39 is a milliammeter 54 on which the effect of the light 3, which is to be tested, on the tube 30 may be read.

The operation of my device is as follows: The table 15 is adjusted so as to be horizontally level if it is not already so by means of the action of bolt 12 on wheel 8. When table 15 is horizontally level the device is wheeled in front of the headlight to be tested and the height of table 15 is adjusted by means of hand wheel 19 so that fixed pin 21 on baffle plate 20 is located at the top of the lamp at the point of contact between the headlight lens and its carrying ring. The lower pin 23 is then set into proper position for the size of headlight to be tested and plate 20 is adjusted so that both pins are in contact with the lamp. There is thus provided means for fixing the device in proper location relative to the lamp to be tested. Tube 26 is then adjusted to the proper position for the lamp to be tested according to the chart. Baffle plate 20 is sufficiently large to exclude from headlight 1 practically all light so that the only light within the reflector is that furnished by the bulb 3. Selected rays of light which are passing practically parallel to their axis pass down the tubes 24 and 26 which, owing to the treatment of their interior surfaces, exclude practically all other rays. The selected rays pass down tubes 24 and 26 into casing 29 and past anode 31 onto cathode 32. The effect of these light rays on the vacuum tube is amplified in the customary manner by bolt 39 and is read as a reading on meter 54. If this reading corresponds to the standard reading which has been ascertained in the laboratory and published in the form of a chart for various types and sizes of headlights, no adjustment of the headlight is necessary as the filament of bulb 3 is shown to be in its proper position by the geometric relation of tubes 24 and 26. If the reading on meter 54 is too low bulb 3 is adjusted until the proper reading is attained. The various defects which may cause a low reading of the meter are examined and if faults are found they are corrected. If desired, tube 24 need not be exactly horizontal but headlight 1 may be tilted and the device adjusted to read the amount of tilt of the headlight by adjusting hand wheel 37 relative to scale 38. This is desirable because the laws of most states requires that the headlight be tilted. If desired, scale 38 may be calibrated to read the number of inches tilt in twenty-five feet.

As a modification I may, if desired, use but one of the tubes 24 or 26 and thus secure but a single ray of light from the bulb 3 or from the reflector 2. This single ray of light is conducted to the vacuum tube 30, amplified by the amplifying tube 39 and read on meter 54 in the same way described above for two rays of light. The single tube may be mounted for universal movement or for horizontal or vertical movement.

I do not intend to be limited in the practice of my invention save as the scope of the prior art and of the attached claims may require.

I claim:

1. A lamp testing device including a support, a baffle plate mounted on said support, a fixed tube in said plate, a tube movable relative to said plate, said tubes being relatively long and of small diameter so as to cut off all but a ray of light passing axially of said tube, a light sensitive cell receiving said rays of light, and an electric meter for measuring the effect of said light rays on said cell.

2. A lamp testing device including a support, a baffle plate adjustable pivotally relative to said support, a fixed tube mounted in said plate, a tube movable relative to said plate, said tubes being relatively long and narrow to cut off all but a ray of light passing axially of said tube, a light sensitive cell receiving said rays, an electric meter for measuring the effect of said rays on said cell, and means for adjusting said baffle plate and said fixed tube to vary the angle of said fixed tube to the horizontal.

3. A lamp testing device including a support, a baffle plate adjustable pivotally relative to said support, a tube mounted in said plate, said tube being relatively long and narrow to cut off all but a ray of light passing axially of said tube, a light sensitive cell to receive said ray, an electric meter for measuring the effect of said ray on said cell, and means for locating said baffle plate relative to said lamp.

4. A lamp testing device including a support, a fixed tube on said support for receiving a ray of light from said lamp, a tube movable relative to said support for receiving a ray of light from said lamp, said tubes being relatively long and of small internal cross section so as to cut off all but a ray of light passing axially of said tube, and means for comparing the rays of light passing through said tubes.

ROBERT R. KENWORTHY.